UNITED STATES PATENT OFFICE.

SAMUEL E. HASKIN, OF AVOCA, NEW YORK.

CURING TOBACCO.

SPECIFICATION forming part of Letters Patent No. 497,572, dated May 16, 1893.

Application filed April 4, 1892. Serial No. 427,725. (No specimens.)

*To all whom it may concern:*

Be it known that I, SAMUEL E. HASKIN, of Avoca, Steuben county, New York, have invented a new and useful Improvement in Curing Tobacco, which improvement is fully set forth in the following specification.

This invention relates to the treatment of tobacco leaves in a green state to bring them into condition suitable for manufacture of cigars, smoking tobacco, &c.

Although many attempts have heretofore been made to accomplish the artificial curing of tobacco, the great bulk of the crop harvested in the United States is cured by the old method of hanging the heads or clusters of leaves in barns, constructed for the purpose, in such manner as to expose the leaves as much as possible to the action of the air. This treatment must continue for many months before the leaves are properly cured, though the time is somewhat shortened when artificially induced currents of air are caused to circulate through the curing chamber. On examining the changes that occur in the leaf during this treatment it is found that the liquid constituents thereof, which constitute its greater part, are partly evaporated and partly solidified in the cellular fibrous structure, and the leaf loses in curing both weight and bulk. As with other vegetable growths, the tobacco plant owes its distinguishing properties, color and flavor, to the particular character of its fluid constituents, the fibrous portion being merely a woody frame work practically devoid of flavor; and it follows that the more the fluids are exhausted, the greater is the loss of the valuable properties of the plant. This is shown by the fact that, in the ordinary process of curing, the new growth of young and tender leaves, which are readily exhausted in drying by reason of the comparative weakness of their fiber, are in great part rendered wholly unfit for use, whereas these tender leaves, being more delicate and highly flavored than the older and tougher leaves, should, if properly cured, yield the best product. The case is analogous to the drying or curing of hay, in regard to which it has been found that quickly cured hay, in which the juices or saps are largely retained, is highly nutritious; whereas hay cured slowly, and exhausted of the liquid constituents, is practically valueless.

Another essential object to be attained in curing tobacco is the destruction of the germs of fermentation and decomposition, which is effected by exposure to heat and the oxygen of the air. If the leaves are piled together so as to exclude circulation of air, they soon become moldy and begin to rot.

The present invention has for its object first, to effect the curing of the tobacco leaves in a very short period of time, so that the crop may be rendered almost immediately available for the market.

The object of the invention is secondly, to preserve all, or substantially all the liquid constituents of the leaf, by preventing evaporation during the process of curing. By so doing I obtain a superior product, and also a larger yield, since the loss of weight and bulk in the leaf, heretofore referred to, is avoided.

The object of the invention is thirdly to save the young growth of leaves, which result also increases both the quality and quantity of the product. These objects are accomplished by subjecting the leaves to a temperature sufficiently high to effect, in a short space of time, those chemical changes in the juices of the plant which, by ordinary processes, require months to bring about, while at the same time the leaf is kept in a medium of high pressure so that the vaporization and escape of the valuable fluids are prevented. The distinguishing feature of the process, therefore, is the combined action of heat and pressure; but in addition to the application of heat and pressure to the leaves, it is advantageous to keep the compressed and heated air or aeriform fluid constantly circulating through the chamber wherein they are treated. It is further advantageous to maintain this circulation in a steady and uniform manner, so that the leaves shall not be at any point exposed to a strong blast of air, or to the friction of hot air currents.

To distinguish my invention from other processes of curing tobacco, I term it a process of "vulcanization," because the agencies employed, and the effects produced are analogous to the vulcanization of wood.

In carrying out my invention the leaves are placed in a chamber or vessel so constructed as to withstand a high degree of heat and a strong internal pressure.

Any suitable apparatus may be employed, as for example I may use apparatus constructed substantially like that described in Letters-Patent granted to me March 5, 1889, No. 399,196, which includes in conjunction with the vulcanizing chamber or vessel, means for compressing and superheating the air, and means for maintaining a circulation of the heated air through said chamber or vessel.

In practicing my invention I do not limit myself to any particular degrees of heat and pressure, but as a general rule it is to be observed that the pressure should be proportionate to the heat, and always be sufficient to hold evaporation in check. The length of treatment also will vary according to the degree of heat at which the operation is conducted, and inspection will readily show when the vulcanization is complete. For the sake of greater clearness however, I will state, that the air of the vulcanizing chamber may be kept at from 212° to 500° Fahrenheit, and at a pressure of from fifty to one hundred and fifty pounds to the square inch, and that under these conditions the operation should be continued from one to five hours.

The vulcanized leaf which is the product of this process is somewhat similar in appearance to naturally cured tobacco, but is fuller, more pliable and less wrinkled and brittle than the latter and of richer color, and is by these and other characteristics readily distinguishable therefrom.

Having now fully described my said invention, what I claim, and desire to secure by Letters Patent, is—

1. The process of curing or vulcanizing tobacco leaves by subjecting the same to the action of heated air under pressure sufficient to prevent volatilization of the liquid constituents of the leaf, substantially as described.

2. The process of curing or vulcanizing tobacco leaves, by maintaining through the vulcanizing chamber or vessel a circulation of compressed heated air, substantially as described.

3. As a new article of manufacture, tobacco leaves cured by subjecting the same to the action of heated air under pressure sufficient to prevent volatilization of the liquid constituents of the leaf, substantially as described.

In testimony whereof I have signed this specification in the presence of two subscribing witnesses.

SAMUEL E. HASKIN.

Witnesses:
PHILIP MAURO,
REEVE LEWIS.